(12) United States Patent
Eckardt et al.

(10) Patent No.: US 6,709,626 B2
(45) Date of Patent: *Mar. 23, 2004

(54) PROCESS AND APPARATUS FOR INJECTION MOLDING OF MOLDED PARTS HAVING AT LEAST ONE CAVITY

(75) Inventors: Helmut Eckardt, Meinerzhagen (DE); Stephan van der Steen, Kierspe (NL); Marc Wulfrath, Kierspe-Vollme (DE); Rolf Schwesinger, Meinerzhagen (DE)

(73) Assignee: Battenfeld GmbH, Meinerzhagen (DE)

( * ) Notice: Subject to any disclaimer, the term of this patent is extended or adjusted under 35 U.S.C. 154(b) by 46 days.

This patent is subject to a terminal disclaimer.

(21) Appl. No.: 10/106,884

(22) Filed: Mar. 22, 2002

(65) Prior Publication Data

US 2002/0153631 A1 Oct. 24, 2002

(30) Foreign Application Priority Data

Mar. 23, 2001 (DE) .......................................... 101 14 415

(51) Int. Cl.$^7$ .............................................. B29D 22/00
(52) U.S. Cl. .................... 264/570; 264/572; 425/130
(58) Field of Search ................. 264/570, 572; 425/130

(56) References Cited

U.S. PATENT DOCUMENTS

| | | | |
|---|---|---|---|
| 4,101,617 A | 7/1978 | Friederich | 264/93 |
| 5,139,714 A | 8/1992 | Hettinga | 264/45.1 |
| 5,198,240 A | 3/1993 | Baxi | 425/145 |
| 5,505,891 A | 4/1996 | Shah | |
| 5,705,201 A | 1/1998 | Ibar | |
| 5,759,479 A * | 6/1998 | Gotterbauer | 264/572 |
| 5,928,677 A | 7/1999 | Gosdin | 425/130 |
| 6,372,177 B1 * | 4/2002 | Hildesson et al. | 264/572 |
| 6,579,489 B1 * | 6/2003 | Thomas | 264/570 |

FOREIGN PATENT DOCUMENTS

| | | |
|---|---|---|
| DE | 24 61 580 | 7/1975 |
| DE | 28 00 482 A1 | 7/1978 |
| DE | 27 16 817 A1 | 8/1978 |
| DE | 42 19 915 | 12/1993 |
| DE | 93 16 984 U1 | 1/1994 |
| DE | 4240017 | 6/1994 |
| DE | 19518964 | 11/1996 |
| DE | 196 13 134 A1 | 10/1997 |
| DE | 199 03 682 A1 | 8/2000 |
| EP | 0 467 201 A2 | 1/1992 |
| EP | 0 400 308 B1 | 6/1993 |
| GB | 2 322 094 | 8/1998 |
| JP | 5-261750 | 10/1993 |
| JP | 10-156856 | 6/1998 |
| JP | 2001-047472 | 2/2001 |

OTHER PUBLICATIONS

"Testing the water," *European Plastics News*, pp. 35–36 (Nov. 1999).
Michaeli, W., et al., "Gas Oder Wasser?", KU *Kunststoffe*, vol. 89, pp. 56–58 and 60, 62 (1999).
Michaeli, W., et al., "Gas geben mit Wasser," KU *Kunststoffe*, vol. 89, pp. 84 and 86 (1999).
Michaeli, W., et al., "Kühlzeit reduzieren mit der Wasser–Injektionstechnik," KU *Kunststoffe*, vol. 90, pp. 67–72 (2000).

* cited by examiner

Primary Examiner—Suzanne E. McDowell
(74) Attorney, Agent, or Firm—Hamilton, Brook, Smith & Reynolds, P.C.

(57) ABSTRACT

A process for injection molding of molded parts made from thermoplastic plastic material having at least one cavity, which includes: a) injection of thermoplastic plastic melt from an injection unit along a melt flow path into the cavity of an injection-molding die; b) injection of a fluid into the still molten plastic material, so that the latter is pressed against the walls of the cavity; c) allowing the plastic material to cool until the latter forms the molded part in self-supporting manner; and d) releasing the molded part from the cavity of the injection-molding die.

35 Claims, 3 Drawing Sheets

PROCESS AND APPARATUS FOR INJECTION MOLDING OF MOLDED PARTS HAVING AT LEAST ONE CAVITY

RELATED APPLICATION

This application claims priority to German Application 101 14 415.6, filed on Mar. 23, 2001, the entire teachings of which are incorporated herein by reference.

BACKGROUND OF THE INVENTION

An injection molding process used in the manufacture of molded parts from thermoplastic is known, for example, from U.S. Pat. No. 4,101,617. A fluid under pressure is introduced into the still molten plastic melt. The melt is pressed against the cavity wall of the injection-molding die by the pressure thus produced in the interior of the melt; collapsed points due to contraction of volume during cooling are thus avoided.

Nitrogen gas is conventionally used as the fluid, which is injected into the melt under pressure. It has the advantage that as an inert gas, it is not subjected to a chemical reaction in the hot melt. The disadvantage is thus taken into account that the nitrogen is in most cases very expensive to produce. Either the injection-molding device has to be supplied with nitrogen from cylinders or with liquid nitrogen or the gas is recovered on site —for greater gas requirement—for example, by means of molecular filters.

The requirements increasing ever further on the economic viability of the process necessitate ever shorter injection-molding cycles with as high as possible quality of the molded parts to be manufactured. In order to achieve the shorter cycles, various attachments have been made:

European granted patent 0 400 308 proposes, after gas injection into the melt, to allow the gas to emerge again at a point remote from the point of injection; circulation of the gas through the cavity provided is then effected. A cooler is integrated into the gas circuit. A more rapid cooling process for the melt should thus be effected, since cooled gas is supplied in the closed circuit.

German Offenlegungsschrift 4 219 915 however is geared to using cooled gas, which is injected into the melt. Provision is thus made, namely, in that the gas is cooled to temperatures as far as −160° C. The plastic material should cool as rapidly as possible in this manner; the time span from injection of the melt into the injection-molding die to releasing is thus reduced.

SUMMARY OF THE INVENTION

In the previously known processes, it is disadvantageous that, firstly now as before, expensive nitrogen is necessary, and secondly in spite of all measures, the cooling effect remains limited due to the restricted thermal capacity of the gas. Regardless of that, due to the considerable difference in viscosity between melt and gas, there is the problem that flow markings appear now and then on the surface of the molded part, which negatively influence the quality of the molded part to be manufactured.

One aspect of the invention is therefore to further develop the injection-molding process of the generic type, so that the said disadvantages are avoided at least in part. The process should thus make it possible to manage without the use of expensive nitrogen. Furthermore, as short as possible a cooling time should be realizable, which noticeably shortens the injection-molding process. Finally, the process should also ensure that as homogeneous as possible a flow path of the melt into the injection-molding die takes place, so that transfer markings can be avoided as far as possible.

In one embodiment, a process is provided for injection molding of a molded part made from thermoplastic plastic material having at least one cavity. This process includes the injection of plastic melt from an injection unit along a melt flow path into a cavity of an injection-molding die to completely volumetrically fill the cavity with plastic melt in step a). Liquid is injected in step b) into the still molten plastic material so that the latter is pressed against walls of the cavity to form the at least one cavity in the molded part. Compressed gas is introduced into the at least one cavity formed by the liquid. The plastic material is then allowed to cool in step c) until the latter forms the molded parts in a self-supporting manner. The molded part is then released from the cavity of the injection molding die in step d).

A concept of the invention is thus geared to using a liquid having high thermal capacity as fluid to be injected into the melt, wherein this ensures that a rapid cooling process takes place, so that the cycle time of the injection-molding cycle can be noticeably reduced. The additional addition of a compressed gas, for example air, nitrogen (N2) or carbon dioxide ($CO_2$) can be used here, supports the molded-part forming process. A high pressure can be maintained by the gas until the molded part is self-supporting. Furthermore, it is possible to introduce the liquid so that as far as possible, a channel for the gas is provided and this then ensures the actual molded-part formation. This means consequently, that in the first step liquid is added in order to pre-shape a cavity, then gas is introduced in order to at least partly remove the liquid and then the gas is held under pressure in order to form the molded part.

Any group of thermoplastics, regardless of whether they are provided with additives, such as glass fibers, chemical or physical propellants or similar, is provided here as thermoplastic plastic material.

During this procedure, it has been shown, surprisingly, that due to the said features, flow markings hardly appear, which are otherwise to be feared and to be observed during the gas-internal pressure process. This is attributed to the comparable viscosity of the liquid melt with the injected liquid of high thermal capacity.

According to a first further development, provision is made in that during the above process step b), some of the still molten plastic material is displaced from the cavity into a spillover cavity. The flow of plastic material from the cavity into the side cavity is thus controlled by valve means in one embodiment, which are opened or closed according to a temporal model. Specific influencing of the overflow of melt from the main to the side cavity is thus possible. Furthermore, it is conceivable to use several side cavities, which are controlled independently of one another.

The liquid can be injected into the cavity along the melt flow path through the sprue region directly or via the machine nozzle, through which the plastic melt is supplied, or alternatively to that into the cavity directly by means of an injection nozzle, wherein when the requirement is to form several cavities, a separate injection nozzle is provided for each cavity.

In the second case, it can be advantageous if some of the plastic material situated in the cavity is driven back out again from the cavity during the above step b) by the injected liquid in the direction of the injection unit.

A further improvement in the flow behavior of the melt or the control of this behavior can be seen when, before injection of the thermoplastic plastic melt, a pressure which is increased with respect to the ambient pressure is built up in the cavity by introducing a gas. This gas pressure can be controlled and/or regulated during the above step a) as a function of how the injection pressure of the melt increases during its injection. In one embodiment, the gas pressure is operated according to a predetermined pressure or time profile.

It has proved to be a particularly advantageous embodiment that the liquid is tempered before injection into the still molten plastic material. The thought here is namely that the liquid is cooled to a preset temperature range. A temperature range between about −20° C. and +20° C., in one embodiment between about 4° C. and 15° C., is thus provided particularly advantageously. However, it can also be necessary, for example for materials which are damaged by sudden cooling, to heat the liquid to a preset temperature range. A temperature range between about 20° C. and 150° C., in one embodiment between about 40° C. and 100° C., is thus provided particularly advantageously. At the temperature ranges indicated above, the use of water was thought of first and foremost. However, it is also conceivable to use, for example liquefied gases, such as carbon dioxide or nitrogen, in order to particularly strengthen the cooling effect. When using such liquids, a temperature range between about −150° C. and −20° C. is offered, wherein the range from about −60° C. to −40° C. is used in a particular embodiment. Since the liquid is added to the melt under increased pressure, it ensures that the boiling temperature is increased and hence the fluid can be added in liquid form.

In one concept of the invention, particular significance is given to the removal of the injected liquid—possibly still in the injection-molding device. There are several possibilities here in accordance with one embodiment of the invention.

First of all, provision can be made in that after allowing to cool and before releasing, the following process step is executed:

c') injection of compressed gas, in one embodiment compressed air, along the path, through which the liquid was injected into the plastic material, and blowing-off of the liquid from the cavity of the molded part at at least one blow-off point, which is situated at a point, which is remote from the addition point of the liquid.

The blow-off point, in one embodiment, is arranged in the region of the flow path end of the plastic material. In order to achieve a further increased cooling effect, liquid can be added again according to step c') instead of compressed gas and hence circulation of the liquid through the molded part can be achieved.

Alternatively to that, provision can be made in that at the said point in time, the following process step is executed:

c") injection of compressed gas, in one embodiment, compressed air, at a gas addition point which is remote from the point at which the liquid was injected into the plastic material, and blowing-off of the liquid from the cavity of the molded part via the point at which the liquid was injected into the plastic material.

Provision can thus be made to use means which add and discharge again the liquid and/or the compressed gas via the same media path via a suitable transfer device.

Apart from blowing-off of the liquid from the cavity, drawing-off of the liquid is also suitable. Then provision is made in that the following process step is executed:

c''') applying a vacuum at a point fluidly connected to the liquid-filled cavity, in order to draw off the liquid situated in the cavity from the cavity.

The vacuum is thus applied to the injection nozzle for liquid in an advantageous manner. In order to ensure that the molded part is not drawn in on itself by the vacuum, a ventilation opening can be provided before or during application of the vacuum.

The molded-part forming process during injection of melt and of liquid and during curing of the material, can be favorably influenced by appropriate control or regulation of the media pressures. Provision is therefore advantageously made in that a pressure, which is regulated or controlled according to a preset time profile, is exerted on the liquid introduced into the plastic melt during the above steps b) and/or c). The pressure profile can thus be regulated or controlled according to a pulsating rising and falling path; above all the thought is thus of a pressure path running sinusoidally about a preset constant pressure value.

Alternatively, provision can also be made in that the pressure in a first time phase is regulated or controlled at a first, in one embodiment constant, level and in a later, second time phase at a second, in one embodiment constant, level, wherein the first pressure level is lower than the second. The pressure can thus act both on the added liquid and on the additionally added compressed gas, since the compressed gas can also be added during the addition of the liquid.

As a farther advantageous further development, the injection-molding die can be designed so that the cavity or the volume of the cavity forming the molded part is increased before, during or after step b), that is addition of the fluid into the still molten plastic material. This embodiment of an injection-molding die is generally termed as a breathing die.

After the liquid has been removed from the cavity, the opening(s) to the cavity can be sealed by re-injection of melt.

Water, oil or alcohol is suitable as the liquid having high thermal capacity. However, it is also conceivable to use liquid carbon dioxide or liquid nitrogen.

DETAILED DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of various embodiments of the invention follows.

Figure 1:
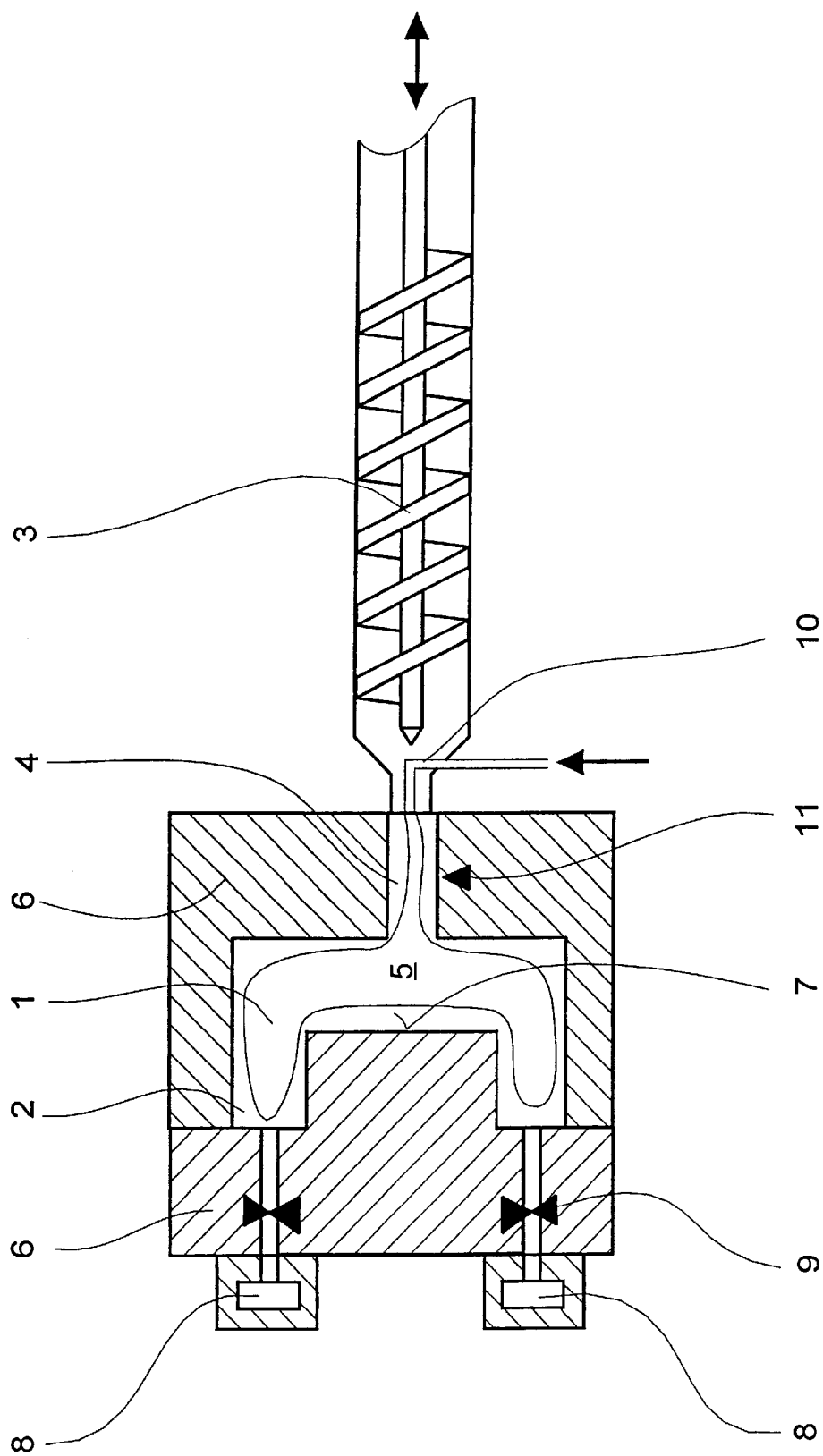
FIG. 1 is the schematic section through an injection-molding device.

An injection-molding device, which has an injection unit 3 which produces plastic melt in conventional manner and injects it into an injection-molding die 6, can be seen in FIG. 1. The die 6 has a cavity 5 with a cavity wall 7. The plastic melt is thus injected from the injection unit 3 into the die 6 along a melt flow path 4 through a machine nozzle.

The molded part 2 to be produced thus has a cavity 1, which firstly makes the part lighter and requires less use of material, which secondly makes it possible that during cooling of the melt, the latter is pressed against the cavity wall 7 in the cavity 5. The molded parts 2 produced therefore have a particularly good surface quality.

Provision can be made in that during injection of the melt into the cavity 5 and/or during addition of the fluid, some of the melt flows over into an overflow cavity 8. Overflow can be controlled or regulated by valve means 9.

Injection of the fluid takes place predominantly via the injection nozzle 10. As can be seen, the fluid therefore expands along the melt flow path 4 in the direction of the cavity 5.

A liquid having high thermal capacity is used according to a particular embodiment of the invention as fluid. This leads to a very short cycle time, since the liquid can absorb much heat from the plastic melt. It therefore solidifies in a short time, which is why the releasing process—compared with known processes—can start earlier.

The cavity 5 is completely filled before injection of the liquid. The liquid, which can include in one embodiment water, is then injected. By tempering the liquid, namely by cooling to a value between about 4° C. and 15° C., it is possible to ensure that very rapid curing of the plastic melt takes place, wherein it is sufficient to cool the plastic material such that is it self-supporting.

It can be seen in FIG. 1 that the addition of the liquid along the melt flow path 4 takes place in the region of the sprue 11. The detailed design of the region of the injection-molding die is shown in FIGS. 2 and 3.

Figure 2:
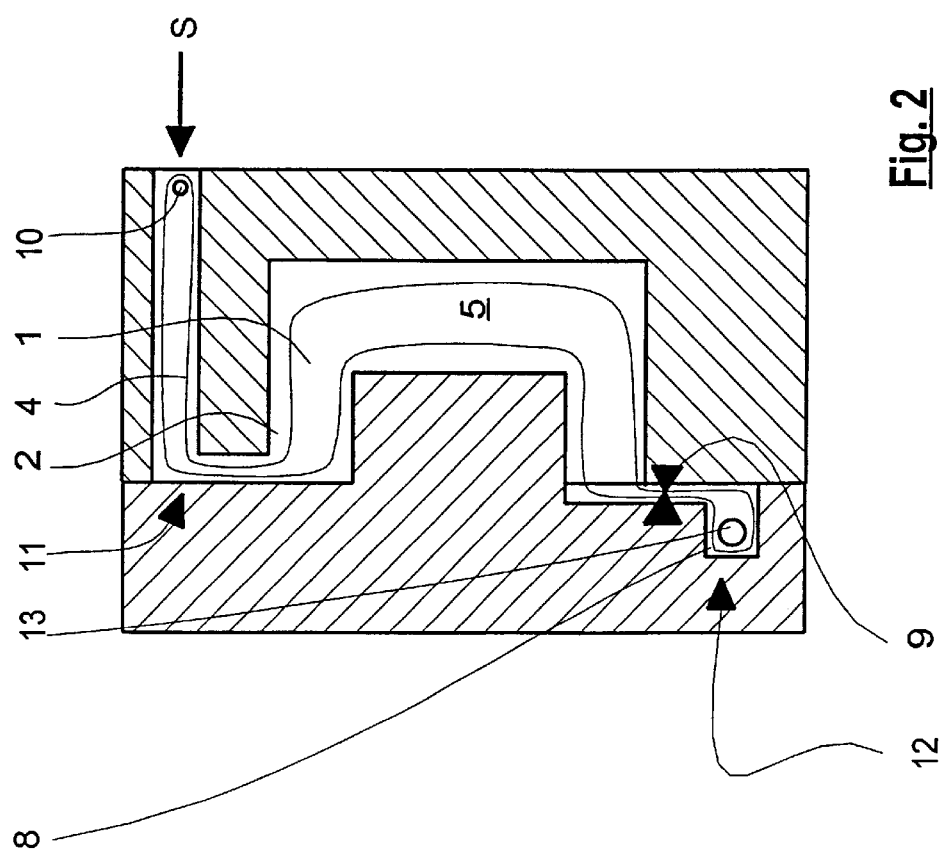
FIG. 2 is the schematic section through an injection-molding die with side cavity.

As can be seen in FIG. 2, melt S is injected into the cavity 5 in the sprue region 11. For example, water is added via the injection nozzle 10 for liquid. The displaced melt flows, as has already been mentioned above, at the flow path end from the main cavity 5 into the side cavity 8, wherein overflow is regulated by means of valve means 9. After at least partly completed curing, the liquid, which fills the cavity 1, must be removed again from the latter. Compressed air is thus introduced into the injection nozzle for liquid 10.

As can be seen from FIG. 2, the cavity 1 extends via the cavity 5 into the side cavity, which has been effected by the addition of liquid into the melt. A blow-off nozzle 13 is positioned in the region of the overflow cavity 8, namely at the blow-off point 12 for liquid. All liquid can be blown off again from the cavity 1 by the injection of compressed air through the nozzle 10. It is driven out through the blow-off nozzle 13. A vacuum can thus be applied to the blow-off nozzle 13—in supporting manner. The blow-off nozzle 13 can also be arranged at the end of the main cavity 5.

Figure 3:
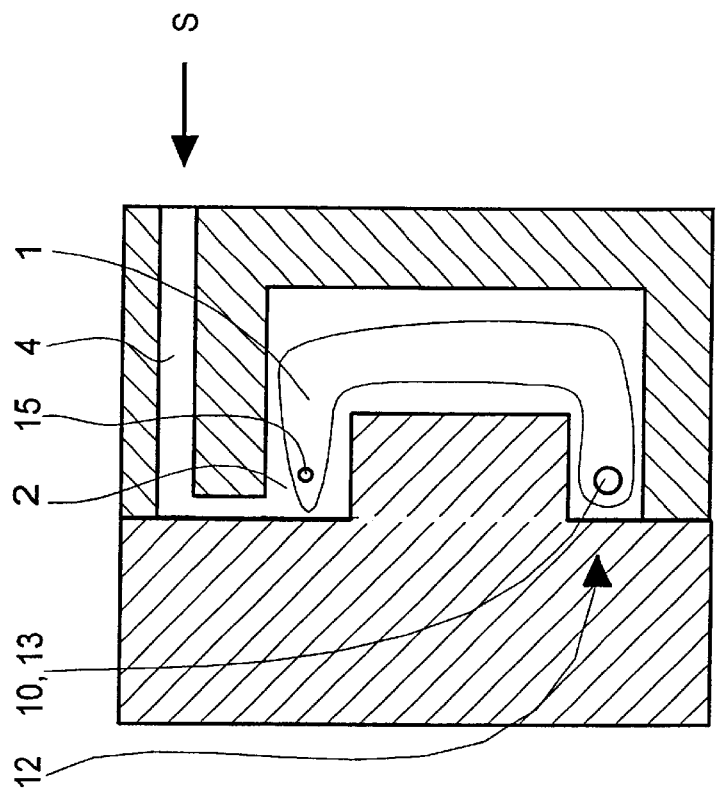
FIG. 3 is the same section as in FIG. 2, but without side cavity.

FIG. 3 shows a further process in accordance with one aspect of the invention. The cavity of the mold completely filled with melt is exposed to liquid via the injection nozzle for liquid 10, which is arranged at the end of the cavity. The melt thus displaced is pressed back via the melt flow path 4 counter to its flow direction and indeed so far that the gas addition point 15 can project into the cavity 1 formed. The cavity 1 is then exposed to compressed gas in order to at least partly remove the liquid from the cavity via the blow-off point for liquid 13. Provision is thus made to use a nozzle as described in FIG. 4. However, the process can also be used without pressing back the melt, care should be taken here only to ensure that the gas addition point 15 is positioned so that it can project into the cavity 1 as described above, since the latter will be considerably smaller during pure volume compensation.

Figure 4:
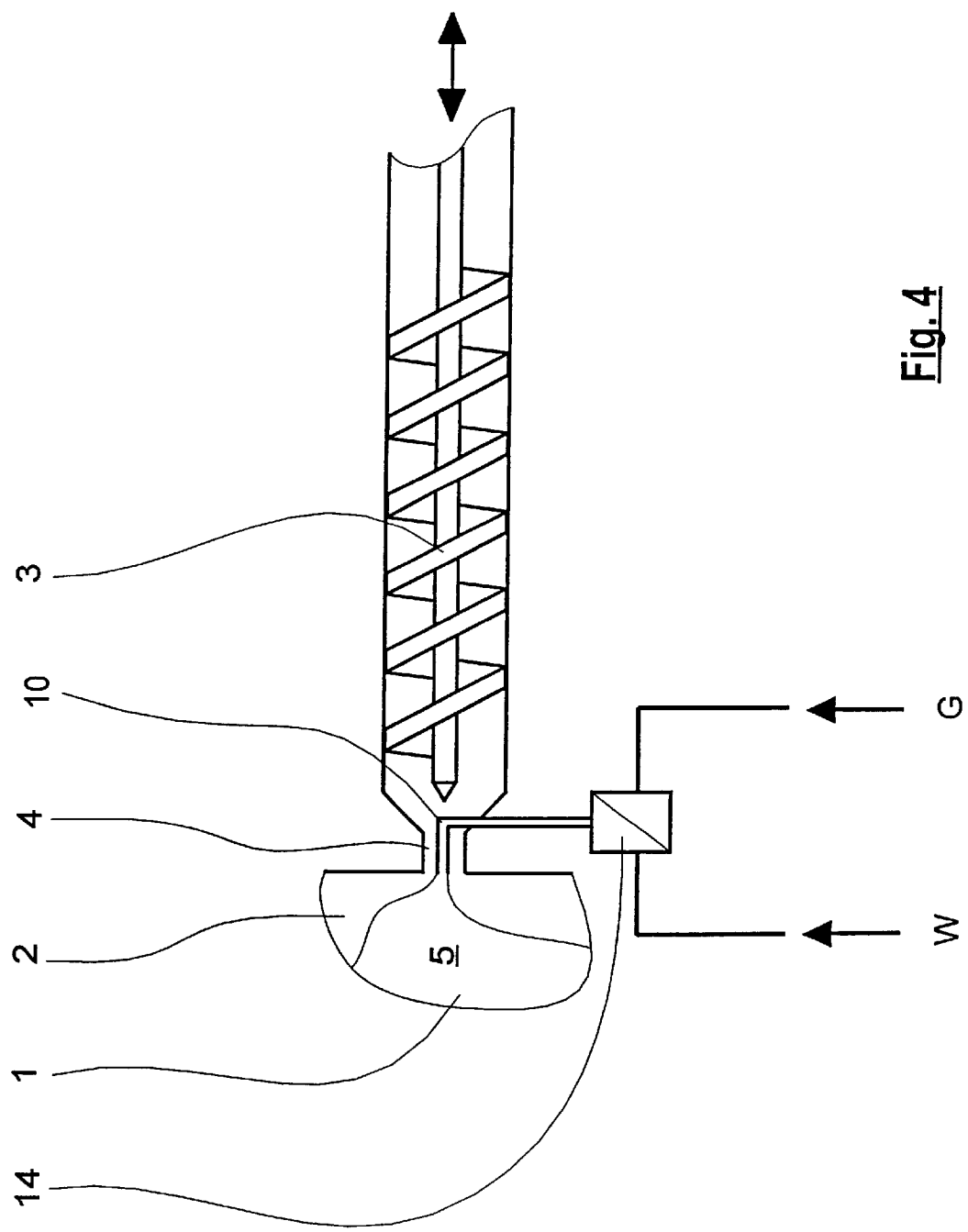
FIG. 4 is a cutout through the injection region for melt and liquid.

It can be seen in FIG. 4 that in terms of device technology, a particularly advantageous embodiment is produced when an injection element 14 is used, through which, if required, liquid (water) W or compressed air (gas) G can be injected. In FIG. 4, the injection nozzle 10 for liquid and gas indeed extends into the region of the melt flow path 4 from the injection unit 3 into the die cavity. However, it is equally possible to arrange the combined injection element 14 for liquid and gas, so that it injects liquid or gas directly into the cavity of the die via the appropriate nozzle.

The process described above can also advantageously be used for otherwise conventional injection-molding processes. For example, it can also be used well if the molded part is injection-molded from more than one plastic component (2-C process).

Furthermore, it is possible, for example to inject the liquid into the die at two points, hence to produce two media bubbles and arrange for them to melt with one another by appropriate pressure control.

Furthermore, the addition of liquid can also take place in the spreader, as a result of which several part cavities can be supplied with liquid.

The apparatus and method can be implemented herein as disclosed in U.S. application Ser. No. 10/106,800, (Attorney's Docket No. 1959.2015-000), filed on Mar. 22, 2002, the entire teachings of which are incorporated herein by reference.

While this invention has been particularly shown and described with references to preferred embodiments thereof, it will be understood by those skilled in the art that various changes in form and details can be made therein without departing from the scope of the invention encompassed by the appended claims.

What is claimed is:

1. Process for injection molding of a molded part made from plastic material having at least one cavity, comprising:
   a) injection of plastic melt from an injection unit along a melt flow path into a cavity of an injection-molding die;
   b) injection of a fluid into the still molten plastic material, so that the latter is pressed against walls of the cavity to form the at least one cavity;
   c) allowing the plastic material to cool until the latter forms the molded part in self-supporting manner; and
   d) releasing the molded part from the cavity of the injection-molding die;
   wherein filling of the cavity of the injection-molding die with plastic melt according to step a) is effected so that the injection-molding die cavity is filled completely volumetrically with plastic melt, and liquid is used as fluid, which according to step b) is injected into the still molten plastic material; and wherein during or after step b) and before step c), compressed gas is introduced into the at least one cavity formed by the liquid in the molded part, and during process step b), some of the still molten plastic material is displaced from the cavity into a spillover cavity.

2. Process according to claim 1, wherein the flow of plastic material from the cavity into the side cavity is controlled by valve means, which are opened or closed according to a temporal model.

3. Process according to claim 1, wherein the liquid is injected into the cavity along the melt flow path through a sprue region.

4. Process according to claim 1, wherein the liquid is injected into the cavity directly by means of at least one injection nozzle.

5. Process according to claim 4, wherein some of the plastic material situated in the cavity is driven back out from the cavity during step b) by the injected liquid in the direction of the injection unit.

6. Process according to claim 1, wherein a pressure which is increased with respect to the ambient pressure is built up in the cavity by introducing a gas before injection of the thermoplastic plastic melt according to step a).

7. Process according to claim 6, wherein the gas pressure during step a) is controlled and/or regulated according to a pressure or time profile.

8. Process according to claim 7, wherein the gas pressure is controlled or regulated as a function of how the injection pressure of the melt increases during step a).

9. Process according to claim 1, wherein the liquid is tempered before injection into the still molten plastic material according to step a).

10. Process according to claim 9, wherein the liquid is cooled to a preset temperature range.

11. Process according to claim 10, wherein the preset temperature range lies between about −20° C. and +20° C.

12. Process according to claim 10, wherein the preset temperature range lies between about 4° C. and 15° C.

13. Process according to claim 10, wherein the preset temperature range lies between about −150° C. and −20° C., and wherein a liquefied gas is added as the liquid.

14. Process according to claim 10, the preset temperature range lies between about −60° C. to −40° C.

15. Process according to claim 10, the preset temperature range lies between about 20° C. and 150° C.

16. Process according to claim 10, the preset temperature range lies between about 45° C. and 100° C.

17. Process according to claim 1, wherein after step c) and before step d), the following process step is executed:

c') injection of compressed gas, along the path, through which the liquid was injected into the plastic material, and blowing-off of the liquid from the cavity of the molded part a least one blow-off point, which is situated at a point, which is remote from the addition point of the liquid.

18. Process according to claim 17, wherein the compressed gas includes compressed air.

19. Process according to claim 17, wherein the blow-off point is arranged in the region of the flow path end of the plastic material.

20. Process according to claim 1, wherein after step c) and before step d), the following process step is executed:

c") injection of compressed gas, at a gas addition point which is remote from the point at which the liquid was injected into the plastic material, and blowing-off of the liquid from the cavity of the molded part via the point at which the liquid was injected into the plastic material.

21. Process according to claim 20, wherein the compressed gas in step c" includes compressed air.

22. Process according to claim 1, wherein after step c) and before step d), the following process step is executed:

c''') applying a vacuum at a point fluidly connected to the liquid-filled cavity, in order to draw off the liquid situated in the cavity from the cavity.

23. Process according to claim 22, wherein the vacuum is applied to the injection nozzle for liquid.

24. Process according to claim 1, wherein a pressure, which is regulated or controlled according to a preset time profile, is exerted on the liquid introduced into the plastic melt during steps b) and/or c).

25. Process according to claim 24, wherein the pressure is regulated or controlled according to a pulsating rising and falling profile.

26. Process according to claim 25, wherein the pressure path runs sinusoidally about a preset constant pressure value.

27. Process according to claim 24, wherein the pressure in a first time phase is regulated or controlled at a first level and in a later, second time phase at a second level, wherein the first pressure level is lower than the second.

28. Process according to claim 27, wherein the first level and the second level are substantially constant.

29. Process according to claim 1, wherein a liquid of high thermal capacity is used as the liquid.

30. Process according to claim 1, wherein water is used as the liquid.

31. Process according to claim 1, wherein oil or a liquefied gas is used as the liquid.

32. Process according to claim 1, wherein the plastic material includes a thermoplastic material.

33. Process for injection molding of a molded part formed from a plastic material and having at least one cavity, comprising:

a) injecting plastic melt into a cavity of an injection-molding die to substantially volumetrically fill the same with plastic melt;

b) injecting a liquid into the cavity of the injection-molding die while the plastic melt is still at least partially melted so as to press at least some of the plastic melt against at least one wall of the injection-molding die to form the at least one cavity in the part, at least some of the plastic melt being displaced from the cavity into a spillover cavity;

c) injecting compressed gas into the at least one cavity of the part;

d) allowing the plastic melt to cool until it forms the molded part in a self-supporting manner; and e) releasing the molded part from the cavity of the injection-molding die.

34. Process for injection molding of a molded part formed from a plastic material and having at least one cavity, comprising:

a) injecting plastic melt into a cavity of an injection-molding die to completely fill the same with plastic melt;

b) injecting a liquid into the cavity of the injection-molding die while the plastic melt is still at least partially melted so as to press at least some of the plastic melt against at least one wall of the injection-molding die to form the at least one cavity in the part, at least some of the plastic melt being displaced from the cavity into a spillover cavity;

c) injecting compressed gas into the at least one cavity of the part;

d) allowing the plastic melt to cool until it forms the molded part in a self-supporting manner; and e) releasing the molded part from the cavity of the injection-molding die.

35. An apparatus for forming an injection-molded part having at least one cavity therein, comprising:

an injection-molding die having at least one cavity where the injection-molded part is formed;

an injection unit for injecting the at least one cavity of the injection-molding die with plastic melt;

a supply of liquid that is injected into the at least one cavity of the injection-molding die while the plastic melt is still at least partially melted so as to press the plastic melt against at least one wall of the injection-molding die to form the at least one cavity in the part, at least some of the plastic melt being displaced from the cavity into a spillover cavity; and a supply of compressed gas that is injected into the at least one cavity of the part while the part is at least partially melted.

* * * * *